(12) United States Patent
Kim et al.

(10) Patent No.: US 7,620,115 B2
(45) Date of Patent: Nov. 17, 2009

(54) SPACE CODE BLOCK CODING AND SPREADING APPARATUS AND METHOD FOR TRANSMISSION DIVERSITY AND CDMA DIVERSITY TRANSMITTER AND CDMA MOBILE STATION RECEIVER USING THE SAME

(75) Inventors: Il-Gyu Kim, Seoul (KR); Young-Hoon Kim, Daejon (KR); Seung-Chan Bang, Daejon (KR); Chan-Bok Jeong, Daejon (KR); Sang-Woo Nam, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 621 days.

(21) Appl. No.: 11/303,846

(22) Filed: Dec. 16, 2005

(65) Prior Publication Data

US 2006/0280229 A1 Dec. 14, 2006

(30) Foreign Application Priority Data

Jun. 8, 2005 (KR) .................. 10-2005-0048940

(51) Int. Cl.
H04B 7/02 (2006.01)
(52) U.S. Cl. .................. 375/267; 375/146; 375/260; 375/299; 375/316; 375/355; 370/208; 370/210; 370/342
(58) Field of Classification Search ......... 375/135–138, 375/144–148, 219, 260, 267, 299, 306, 347, 375/350, 351, 355; 455/101, 103, 130; 370/208, 370/210, 203, 342
See application file for complete search history.

(56) References Cited

U.S. PATENT DOCUMENTS 6,185,258 B1 2/2001 Alamouti et al.

(Continued)

FOREIGN PATENT DOCUMENTS

JP 2005-012531 1/2005

(Continued)

OTHER PUBLICATIONS

Siavash M. Alamouti, "A Simple Transmit Diversity Technique for Wireless Communications," IEEE Journal on Select Areas in Communications, vol. 16, No. 8, Oct. 1998, pp. 1451-1458.

(Continued)

Primary Examiner—Shuwang Liu
Assistant Examiner—Hirdepal Singh
(74) Attorney, Agent, or Firm—Ladas & Parry LLP

(57) ABSTRACT

A space code block coding and spreading apparatus for transmission diversity, a Code Division Multiple Access (CDMA) diversity transmitter using it, and a CDMA mobile station receiver for receiving a transmission diversity signal, which are capable of improving the performance of system in wireless channel environments by allowing a transmission diversity to be made within one symbol interval in a CDMA communication system. The apparatus includes an encoder for generating a predetermined number of different transmission data with respect to a plurality of modulation symbols inputted during one modulation symbol interval, an orthogonal code generator for producing orthogonal codes, a spreader for spreading each of the transmission data generated from the encoder using the orthogonal codes generated from the orthogonal code generator, and a combining unit for combining the transmission data spread at the spreader to provide combined data for each transmission antenna path.

14 Claims, 15 Drawing Sheets

U.S. PATENT DOCUMENTS

| | | | |
|---|---|---|---|
| 7,477,703 B2 * | 1/2009 | Hottinen et al. | 375/299 |
| 7,545,875 B2 * | 6/2009 | Zhang et al. | 375/267 |
| 2005/0141414 A1 * | 6/2005 | Cheun et al. | 370/210 |
| 2005/0174932 A1 * | 8/2005 | Deng et al. | 370/208 |
| 2005/0185575 A1 * | 8/2005 | Hansen et al. | 370/208 |
| 2007/0140377 A1 * | 6/2007 | Murakami et al. | 375/299 |
| 2007/0248149 A1 * | 10/2007 | Shimomura et al. | 375/146 |

FOREIGN PATENT DOCUMENTS

| | | |
|---|---|---|
| KR | 1020010107770 | 12/2001 |
| KR | 1020020004878 | 1/2002 |
| KR | 1020030062791 | 7/2003 |

OTHER PUBLICATIONS

Vahid Tarokh et al, "Space-Time Block Codes from Orthogonal Designs," IEEE Transactions on Information Theory, vol. 45, No. 5, Jul. 1999, pp. 1456-1467.

* cited by examiner

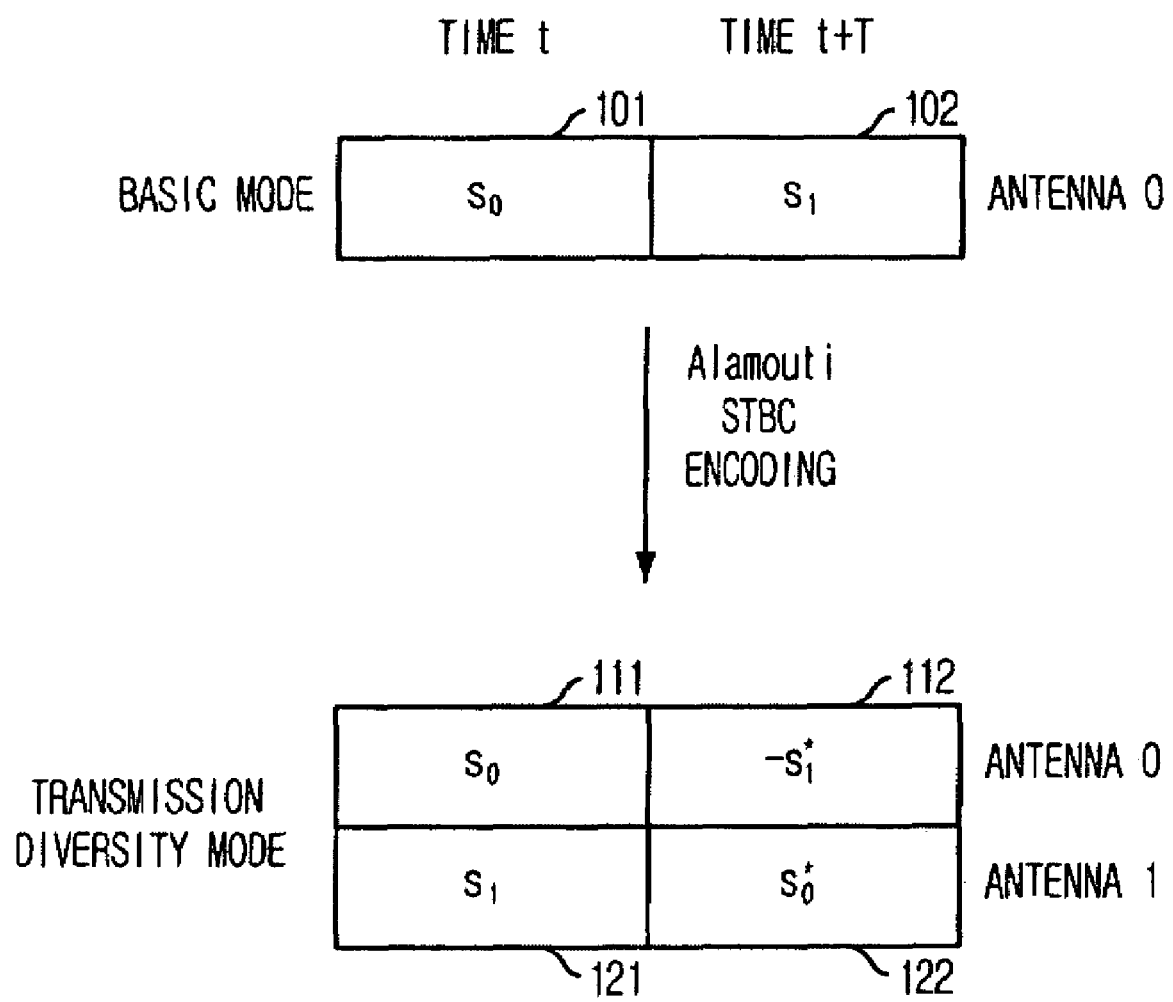

US 7,620,115 B2

SPACE CODE BLOCK CODING AND SPREADING APPARATUS AND METHOD FOR TRANSMISSION DIVERSITY AND CDMA DIVERSITY TRANSMITTER AND CDMA MOBILE STATION RECEIVER USING THE SAME

FIELD OF THE INVENTION

The present invention relates to a space code block coding and spreading apparatus and method for transmission diversity and a Code Division Multiple Access (CDMA) diversity transmitter and a CDMA mobile station receiver using the same. More particularly, the invention is directed to a space code block coding and spreading apparatus and method for transmission diversity, and a CDMA diversity transmitter and a CDMA mobile station receiver using it, which are capable of improving the performance of a system in wireless channel environments by allowing a transmission diversity to be made within one symbol interval in a CDMA communication system.

DESCRIPTION OF RELATED ART

FIG. 1 shows a view describing the concept of a conventional transmission diversity method using a space time block coding technique.

One of the conventional transmission diversity techniques is "Space Time Block Coding (STBC)" proposed in "IEEE Journal on select areas in communications" by Siavash M. Alamouti in 1998. Such an STBC scheme is a scheme that performs a diversity encoding with respect to data to be transmitted in space (antenna) and time domains and then transmits it, as shown in FIG. 1.

In other words, in a basic mode where the number of transmission antenna is one, if a modulation symbol transmitted at an arbitrary timeslot t 101 is $s_0$ and a modulation symbol transmitted at its adjacent timeslot t+T 102 is $s_1$, the transmission diversity technique using the STBC encoding method proposed by Alamouti transmits the first symbol $s_0$ via a first antenna (antenna 0) at a timeslot t 111 and its conjugate complex $s_0^*$ via a second antenna (antenna 1) at its adjacent timeslot t+T 122, as can be seen from FIG. 1. The second symbol $s_1$ is transmitted via the second antenna (antenna 1) at a timeslot t 121 and its negative conjugate complex $-s_1^*$ via the first antenna (antenna 0) at its adjacent timeslot t+T 112. Namely, the Alamouti's STBC encoding method is a method which acquires a diversity gain by transmitting each modulation symbol at two adjacent time intervals via different antennas.

FIG. 2a is a circuitry diagram showing a configuration of a transmitter that implements a conventional STBC transmission diversity method in Multi Carrier-CDMA (MC-CDMA) system. That is, FIG. 2a represents a configuration of a base station transmitter where one channelization code is assigned to an arbitrary kth user, in the MC-CDMA system to which the Alamouti's STBC encoding method is applied.

Specifically, channel-encoded data is first modulated at a modulator 201 using Quadrature Phase Shift Keying (QPSK) or M-ary Quadrature Amplitude Modulation (QAM) and then applied to an STBC encoder 202.

The STBC encoder 202 gets two symbols every two Orthogonal Frequency Division Multiplexing (OFDM) symbol intervals and performs STBC encoding to obtain an encoded symbol for each of two diversity antennas, as shown in FIG. 2a. In other words, during a first symbol interval, $s_{k,0}$ and $s_{k,1}$ are outputted to paths for a first and a second antennas, respectively, while, during a second symbol interval, $-s_{k,1}^*$ and $s_{k,0}^*$ are provided to the paths for the first and the second antennas, respectively. Here, the asterisk "*" represents a conjugate complex.

The two outputs from the STBC encoder 202 are duplicated at each of duplicators 203a and 203b by N every symbol interval; and then each of the duplicated values is multiplied by an orthogonal code with the length of N assigned to a current channel at each of orthogonal code multipliers 204a and 204b. Here, the orthogonal codes multiplied with respect to the two antenna paths are $C^{(k,0)} = [C_0^{(k,0)} C_1^{(k,0)} \ldots C_{N-1}^{(k,0)}]^T$ which is given as the same one. And, k indicates a kth user and T represents a transposition matrix.

The N symbols with respect to each of the antenna paths multiplied by the orthogonal codes are combined with symbols of other channels at channel combiners 205a and 205b, respectively. Outputs from the channel combiners 205a and 205b are multiplied by scrambling codes at scramblers 206a and 206b and then converted into time domain signals at parallel/serial converters 208a and 208b via Inverse Fast Fourier Transformers (IFFTs) 207a and 207b. Thereafter, Cyclic Prefix (CP) is inserted into the signals at CP inserters 209a and 209b; and then the CP-inserted signals are amplified and converted into RF signals at IF/RF processors 210a and 210b to transmit via antennas 211a and 211b.

As described above, the conventional STBC diversity method acquires the diversity gain by transmitting the arbitrary one symbol to the different antennas via the two paths at the two adjacent symbol intervals, that is, two. different time intervals.

FIG. 2b is a view describing the concept of a conventional STBC transmission diversity method in MC-CDMA system.

As shown in FIG. 2, a modulation symbol $s_{k,0}$ is transmitted via a first antenna (antenna 0) at a time $T_0$ (OFDM symbol interval 0) and then its conjugate complex $s_{k,0}^*$ via a second antenna (antenna 1) at a time $T_1$ (OFDM symbol interval 1). Conversely, a modulation symbol $s_{k,1}$ is transmitted via the second antenna (antenna 1) at the time $T_0$ (OFDM symbol interval 0) and then its negative conjugate complex $-s_{k,1}^*$ via the first antenna (antenna 0) at the time $T_1$ (OFDM symbol interval 1).

At a receiver of the transmitter using the conventional STBC diversity method, $s_{k,0}$ and $s_{k,1}$ are recovered using the symbols received at the two adjacent time intervals.

In other words, signals received at each of the intervals $T_0$ and $T_1$ are transformed by taking Fast Fourier Transform (FFT) and then descrambled. If symbols obtained by adding the descrambled signals to a signal despread to $C^{(k,0)}$ are $r_0$ and $r_1$, respectively, the symbols may be represented as:

$$r_0 = \alpha_0(T_0) s_{k,0} + \alpha_1(T_0) s_{k,1} + n_0$$

$$r_1 = -\alpha_0(T_1) s^*_{k,1} + \alpha_1(T_1) s^*_{k,0} + n_0 \qquad \text{Eq. (1)}$$

In Eq. (1) above, $\alpha_a(T_e)$ implies a channel component of signal received via an ath reception antenna at an interval $T_e$, which generally has a Rayleigh distribution. And, $n_i$ represents a reception noise component of despread and added signal. For example, if a speed of a mobile station is very slow, it satisfies the following equality: $\alpha_a(T_0) \cong \alpha_a(T_1)$. Further, if the above equality is given by $\alpha_a$, the result of STBC decoding may be defined as follows:

$$\hat{s}_0 = r_0 \alpha^*_0 + r^*_1 \alpha_1 = |\alpha_0|^2 s_0 + n_0 \alpha^*_0 + n^*_1 \alpha_1$$

$$\hat{s}_1 = r_0 \alpha^*_1 - r^*_1 \alpha_0 = |\alpha_1|^2 s_1 + n_0 \alpha^*_1 - n^*_1 \alpha_0 \qquad \text{Eq. (2)}$$

If the speed of mobile station is slow, the result of the STBC decoding may be given as Eq. (2) above; and but, if the speed of mobile station is fast, $\alpha_\alpha(T_0) \neq \alpha_\alpha(T_1)$, and thus Eq. (2) above is not satisfied. This causes any interference in each determinant variable. Consequently, as the speed of the mobile station is faster, the interference increases, thereby giving a reason that greatly lowers the performance of system.

FIG. 3 is a circuitry diagram of a transmitter that implements a conventional MC-CDMA diversity method using a multi-code when a data transmission rate is twice. Particularly, FIG. 3 represents an MC-CDMA base station transmitter employing a general STBC transmission diversity technique when two channelization codes are assigned to an arbitrary user.

Here, the meaning that the two channelization codes are assigned is that the data transmission rate is twice compared to an instance of assigning a single code, as in FIG. 1. That is, if it is assumed that the data transmission rate of the example shown in FIG. 1 is a basic data transmission rate R, the data transmission rate of the example in FIG. 3 becomes 2R.

As can be seen from FIG. 3, two pairs of modulation symbols assigned to each of two codes, $s_{k,0}$ and $s_{k,1}$, and $s_{k,2}$ and $s_{k,3}$, are first processed at a serial/parallel converter 301 for their serial to parallel conversions and then each of them is STBC-encoded at STBC encoders 302a and 302b. A more easy description thereof will be given below with reference to FIG. 4. The pair of symbols $s_{k,0}$ and $s_{k,1}$ is STBC-encoded and then spread to $C^{(k,0)} = [C_0^{(k,0)} C_1^{(k,0)} \ldots C_{N-1}^{(k,0)}]^T$; and the pair of symbols $s_{k,2}$ and $s_{k,3}$ is STBC-encoded and then spread to $C^{(k,1)} = [C_0^{(k,1)} C_1^{(k,1)} \ldots C_{N-1}^{(k,1)}]^T$.

In this case, the arbitrary one symbol is also transmitted to different antennas via two paths at two adjacent symbol intervals, i.e., different time intervals; and therefore, the performance of system is very lowered in high speed mobile station environments.

SUMMARY OF THE INVENTION

It is, therefore, a primary object of the present invention to provide a space code block coding and spreading apparatus and method for transmission diversity and a CDMA diversity transmitter using it, which are capable of improving the performance of system in wireless channel environments by allowing a transmission diversity to be made within one symbol interval in CDMA communication system.

Another object of the present invention is to provide a CDMA mobile station receiver for receiving a transmission diversity signal transmitted through the CDMA diversity transmitter and method thereof.

In accordance with one aspect of the present invention, there is provided a Space Code Block Coding (SCBC) and spreading apparatus for transmission diversity in a Code Division Multiple Access (CDMA) communication system, the apparatus comprising: an encoding means for generating a predetermined number of different transmission data with respect to a plurality of modulation symbols inputted during one modulation symbol interval; an orthogonal code generation means for producing orthogonal codes; a spreading means for spreading each of the transmission data generated from the encoding means using the orthogonal codes generated from the orthogonal code generation means; and a combining means for combining the transmission data spread at the spreading means to provide combined data for each transmission antenna path so that a transmission diversity is made within said one modulation symbol interval.

In accordance with another aspect of the present invention, there is provided an SCBC and spreading method for transmission diversity in a CDMA communication system, the method comprising the steps of: (a) generating a predetermined number of different transmission data with respect to a plurality of modulation symbols inputted during one modulation symbol interval; (b) spreading each of the transmission data generated at said step (a) using orthogonal codes; and (c) combining the transmission data spread at said step (b) to ,provide a baseband signal for each transmission antenna path so that a transmission diversity is made within said one modulation symbol interval.

In accordance with still another aspect of the present invention, there is provided a CDMA diversity transmitter for a CDMA communication system, comprising: a modulation means for modulating channel-coded symbol data; a serial/parallel conversion means for converting a plurality of modulation symbols inputted every modulation symbol interval from the modulation means to provide pairs of modulation symbols made every predetermined number of modulation symbols in parallel; a plurality of SCBC and spreading means for generating and spreading a predetermined number of different transmission data every each of the pairs of modulation symbols provided by the serial/parallel conversion means, and combining the spread transmission data so that a transmission diversity is made within one modulation symbol interval; a combining means for combining the outputs from each of the plurality of SCBC and spreading means to generate a baseband signal for each antenna path; and a wireless signal processing means for converting each of the baseband signals into a wireless signal.

In addition, the CDMA diversity transmitter further comprises an Inverse Fast Fourier Transform (IFFT) means for transforming each of the baseband signals in the frequency domain generated from the combining means for each antenna path into a time domain signal, in case where the CDMA communication system employs a Multi-Carrier CDMA (MC-CDMA) scheme, wherein each of the SCBC and spreading means performs the spreading process in the frequency domain.

Furthermore, the CDMA diversity transmitter further comprises a scrambling means for scrambling the outputs from the combining means for each antenna path; and a Cyclic Prefix (CP) insertion means for inserting CP into each of the outputs from the IFFT means.

Moreover, the CDMA diversity transmitter further comprises a multiplexing means for providing modulation symbols of two user channels to be transmitted within one modulation symbol interval to the serial/parallel conversion means alternately, in case where the number of transmission antennas of the transmitter are two and one orthogonal code is assigned to each of a plurality of user channels.

In accordance with still yet another aspect of the present invention, there is provided a CDMA mobile station receiver for receiving a diversity signal transmitted in a CDMA communication system, comprising: a wireless signal processing means for converting a wireless signal received via a reception antenna into a baseband signal; a despreading means for despreading the baseband signal using orthogonal codes; a channel estimation means for estimating a channel value for a wireless path between a transmission antenna of the CDMA communication system and the reception antenna from the despread signal from the despreading means; an SCBC decoding means for recovering a transmitted signal by performing SCBC decoding using the channel estimated value from the channel estimation means and the despread signal from the despreading means; and a bit calculation means for calculating a bit value from the output from the SCBC decoding means.

In addition, the CDMA mobile station receiver further comprises a Fast Fourier Transform (FFT) means for transforming the baseband signal into a frequency domain signal in case where the CDMA communication system employs MC-CDMA scheme.

Moreover, the CDMA mobile station receiver further comprises: a CP removal means for removing a CP from the baseband signal outputted from the wireless signal processing means; a descrambling means for descrambling the frequency domain signal from the FFT means to provide it to the SCBC decoding means and the channel estimation means; and a channel decoding means for performing channel decoding with respect to the output from the bit calculation means.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description, of preferred embodiments taken in conjunction with the accompanying drawings, in which:

FIG. 1 is a view describing the concept of a conventional transmission diversity method using a space time block coding technique;

FIG. 11b is a circuitry diagram illustrating a configuration of the SCBC and spreading unit in accordance with the invention shown in FIG. 11a.

DETAILED DESCRIPTION OF THE INVENTION

The above-mentioned objectives, features, and advantages will be more apparent from the following detailed description in association with the accompanying drawings; and based on this, the invention will be readily conceived by those skilled in the art to which the invention belongs. Further, in the following description, well-known arts will not be described in detail if it seems that they could obscure the invention in unnecessary detail. Hereinafter, a preferred embodiment of the present invention will be set forth in detail with reference to the accompanying drawings.

Figure 2A:
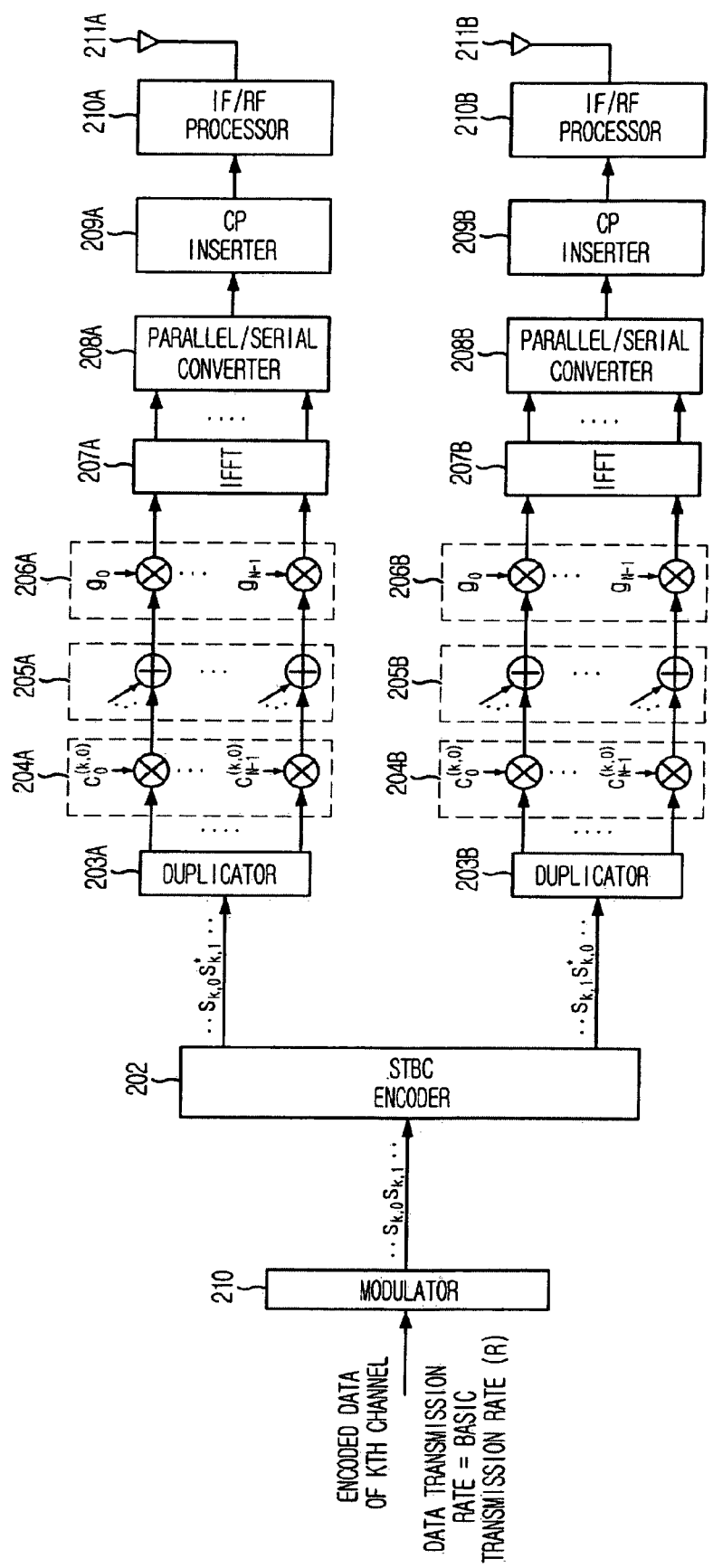
FIG. 2a is a circuitry diagram showing a configuration of a transmitter that implements a conventional STBC transmission diversity method in an MC-CDMA system.
Figure 2B:
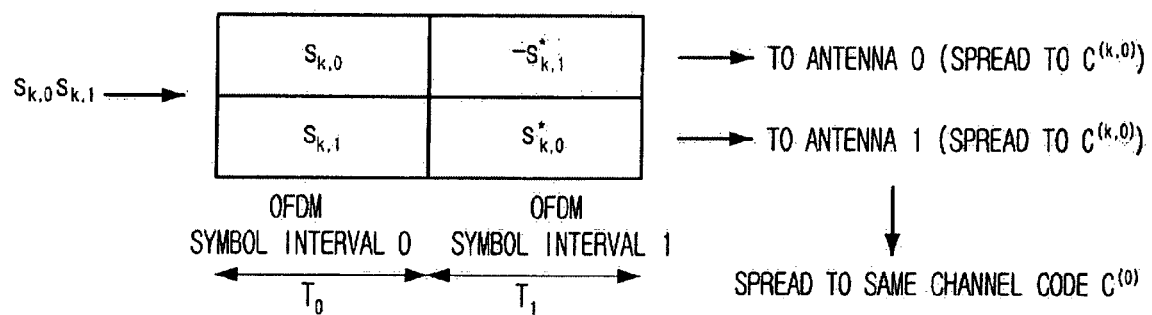
FIG. 2b is a view describing the concept of a conventional STBC transmission diversity method in an MC-CDMA system.
Figure 3:
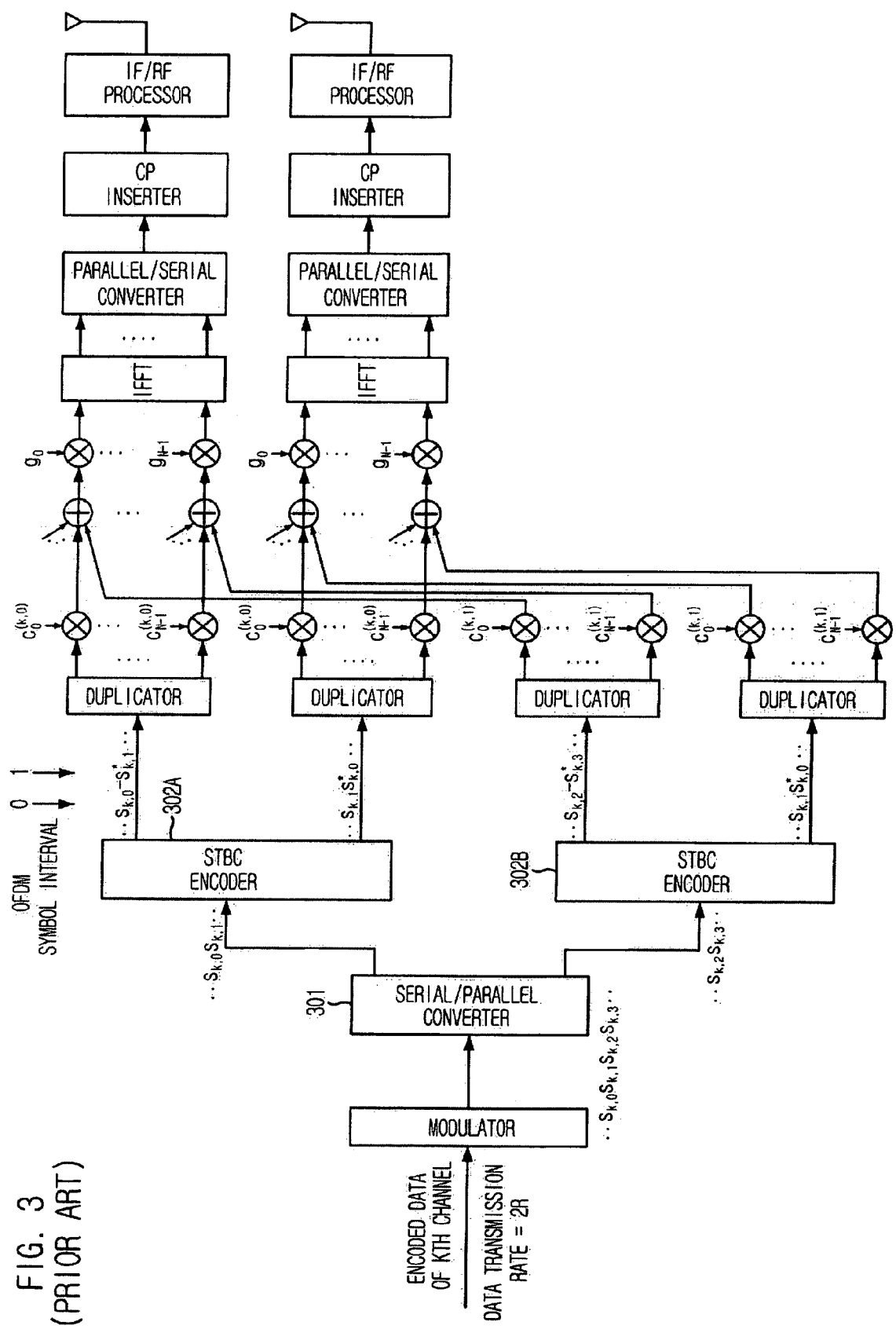
FIG. 3 is a circuitry diagram of a transmitter that implements a conventional MC-CDMA diversity method using a multi-code when a data transmission rate is twice.
Figure 4:
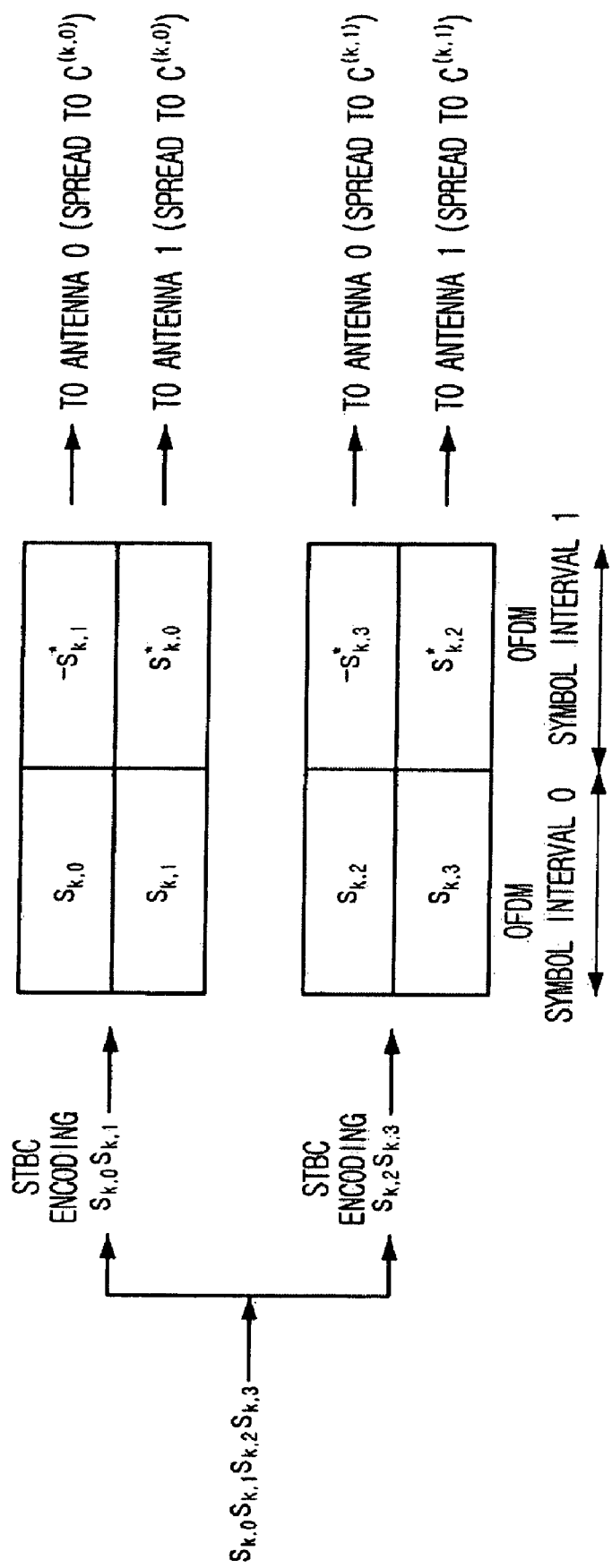
FIG. 4 is a view describing the concept of a conventional MC-CDMA diversity method using a multi-code when a data transmission rate is twice.
Figure 5A:
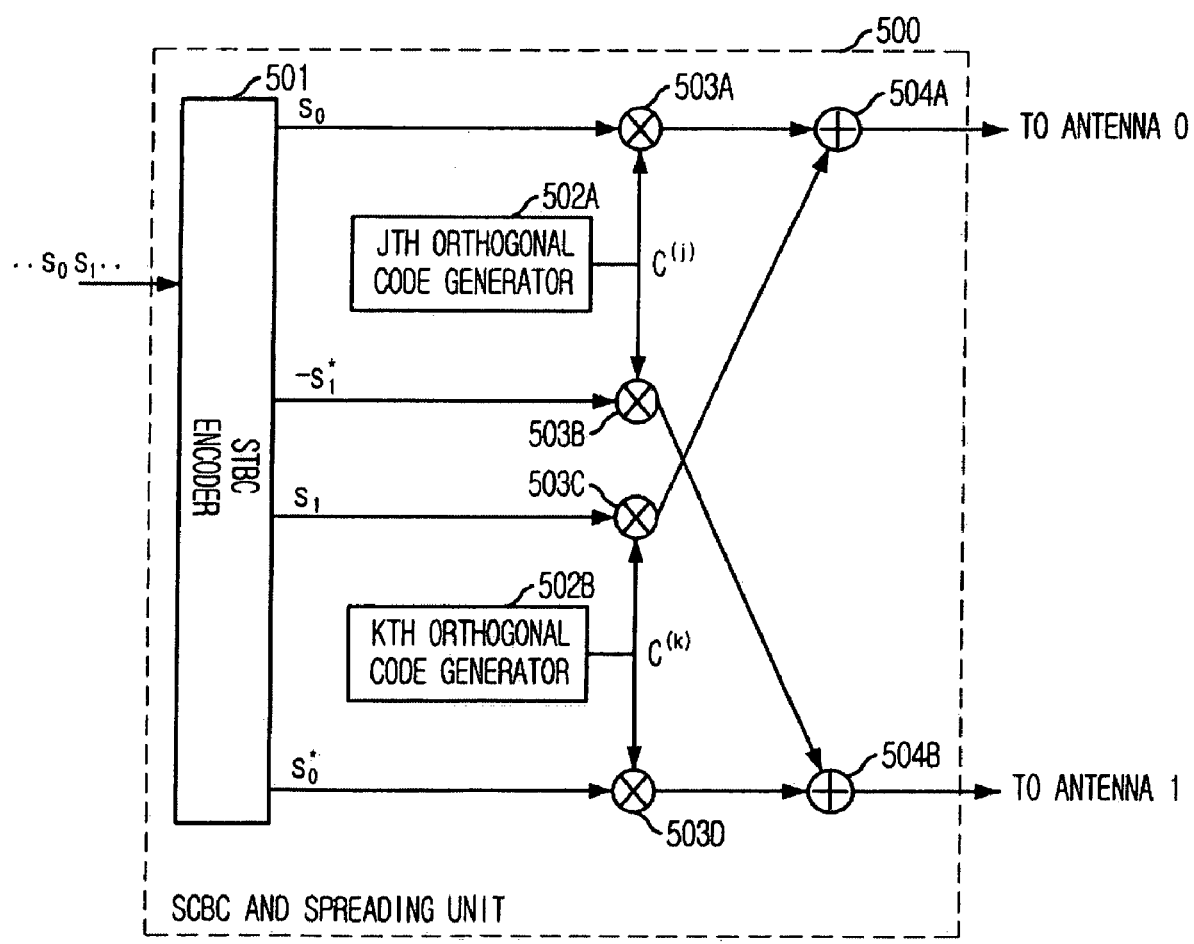
FIG. 5a is a circuitry diagram showing a configuration of one embodiment of a Space Code Block Coding (SCBC) and spreading apparatus for transmission diversity in accordance with the present invention.
Figure 5B:
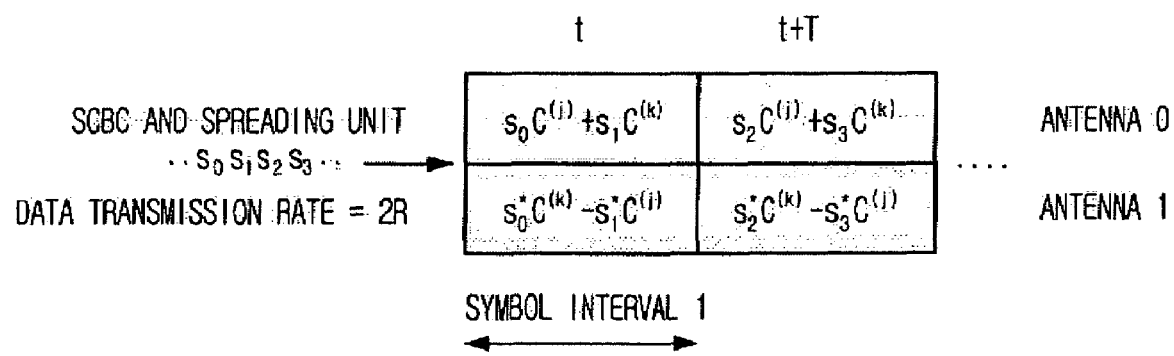
FIG. 5b is a conceptual view describing a SCBC and spreading method for transmission diversity in accordance with the present invention.

FIG. 5a is a circuitry diagram showing a configuration of one embodiment of an SCBC and spreading apparatus for transmission diversity in accordance with the present invention, and FIG. 5b is a conceptual view describing a SCBC and spreading method for transmission diversity in accordance with the present invention. Here, a method for performing the diversity encoding in space (antenna) and code domain is presented.

As shown in FIG. 5a, the SCBC and spreading apparatus 500 in accordance with the present invention comprises an SCBC encoder 501, orthogonal code generators 502a and 502b, spreaders 503a to 503d composed of multipliers, and combiners 504a and 504b composed of adders.

The SCBC encoder 501 simultaneously outputs four symbols, e.g., $s_0$, $s_1$, $-s_1^*$, $s_0^*$, as transmission data, with respect to two input symbols $s_0$ and $s_1$ at arbitrary one modulation symbol interval. That is, the SCBC 501 simultaneously provides four symbols $s_0$, $s_1$, $-s_1^*$, $s_0^*$ in response to the two input symbols $s_0$ and $s_1$ in parallel. The four output symbols include the two input symbols $s_0$ and $s_1$, the input symbol's conjugate complex $s_0^*$, and the input symbol's negative conjugate complex $-s_1^*$.

Among the four output symbols from the SCBC encoder 501, two, e.g., $s_0$ and $-s_1^*$, are spread by binary orthogonal code $C^{(j)}=[c_0^{(j)} c_1^{(j)} c_2^{(j)} \ldots c_{N-1}^{(j)}]^T$, and the remaining two symbols, i.e., $s_1$ and $s_0^*$ are spread by another binary orthogonal code $C^{(k)}=[c_0^{(k)} c_1^{(k)} c_2^{(k)} \ldots c_{N-1}^{(k)}]^T$. Here, T indicates a transposition matrix. And, the two orthogonal codes are orthogonal codes whose cross correlations are "0". Further, the orthogonal codes in the invention are used as direct sequence spread spectrum codes on the frequency axis in case of MC-CDMA or Frequency-Hopping MC-CDMA (FH-MC-CDMA), while being used as direct sequence spread spectrum codes on the time axis in case of Direct Sequence-CDMA (DS-CDMA)(see FIG. 11a).

The orthogonal code generators 502a and 502b generate desired binary orthogonal codes, and the multipliers 503a to 503d multiply the symbols outputted from the SCBC encoder 501 by the corresponding orthogonal codes, respectively. Outputs from the multipliers 503a to 503d are added at the adders 504a and 504b and then transmitted to antennas.

Hereinafter, the concept of the SCBC and spreading method in accordance with the present invention will be described in more detail with reference to FIG. 5b.

A signal $s_0 C^{(j)}$ created by spreading the symbol $s_0$ to the orthogonal code $C^{(j)}$ is added to a signal $s_1 C^{(k)}$ produced by spreading the symbol $s_1$ to the orthogonal code $s_1 C^{(k)}$ to output an added signal to a path for the first antenna (antenna 0). And, a signal $S_0^* C^{(k)}$ created by spreading the symbol $s_0^*$ to the orthogonal code $C^{(k)}$ is added to a signal $-s_1^* C^{(j)}$ obtained by spreading the symbol $-s_1^*$ to the orthogonal code $C^{(j)}$ to provide an added signal to a path for the second antenna (antenna 1).

As a result, a baseband signal transmitted via the first transmission antenna (antenna 0) at the arbitrary transmission symbol interval becomes $S_0 C^{(j)} + s_1 C^{(k)}$, and a baseband signal transmitted via the second transmission antenna (antenna 1) at the arbitrary transmission symbol interval becomes $S_0^* C^{(k)} - s_1^* C^{(j)}$. These two signals are transmitted at one symbol interval concurrently. This feature is the greatest difference of the SCBC transmission diversity method of the invention, which is distinguishable from the conventional STBC transmission diversity method.

Namely, the SCBC and spreading method of the invention performs the space code block coding with respect to the modulated symbols in such a way that the transmission diversity is made within one symbol interval every fixed number of modulated symbols (e.g., two, $s_0$ and $s_1$, in FIGS. 5a and 5b).

The present invention may be applied to the DS-CDMA system that performs the direct sequence spread spectrum on the time axis, and also to the MC-CDMA system or FH-MC-CDMA system that carries out the direct sequence spread spectrum on the frequency axis or two-dimensional spread spectrum on both of the time and frequency axes.

Figure 6A:
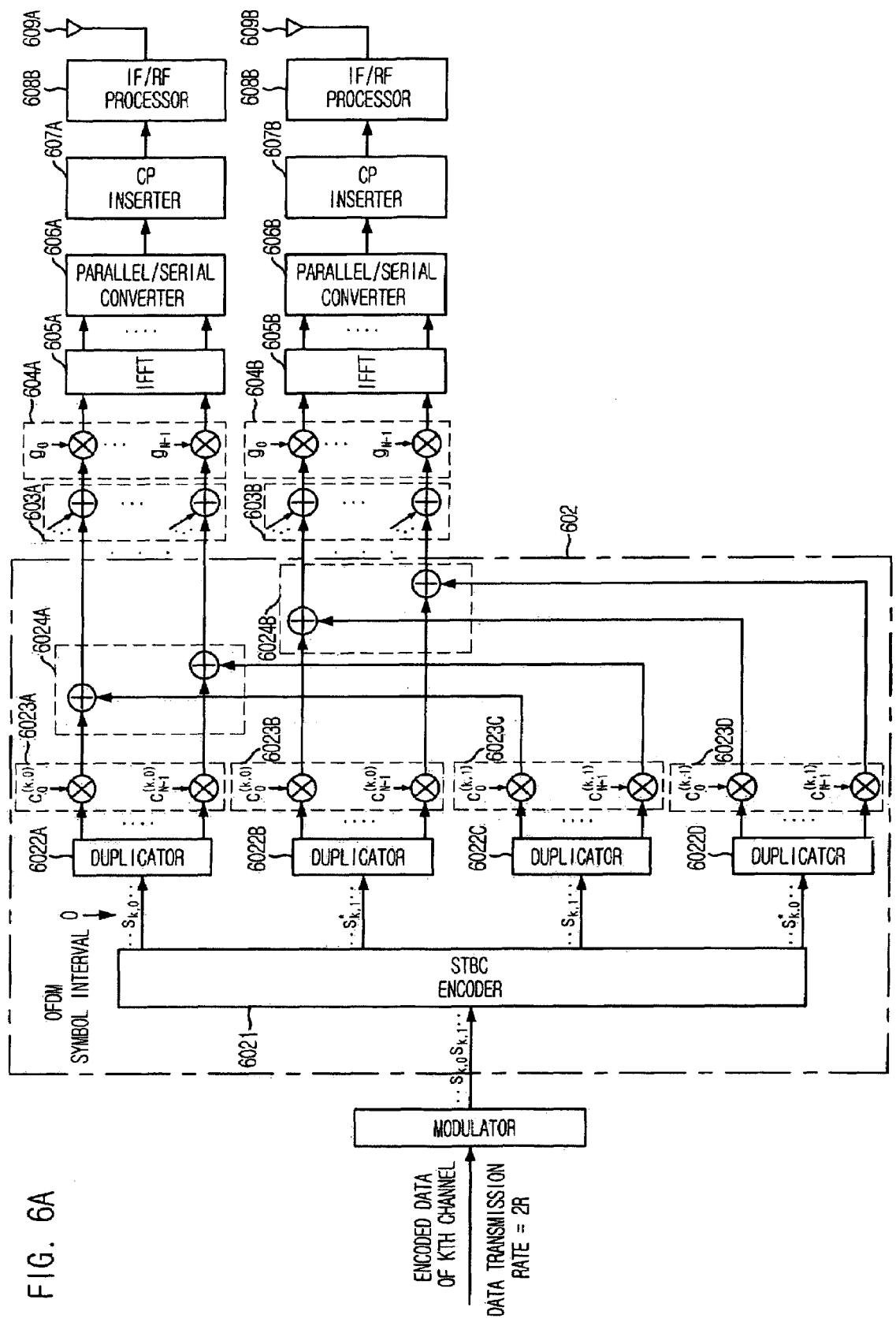
FIG. 6a is a circuitry diagram showing a configuration of one embodiment of a multi-code (e.g., two codes) MC-CDMA diversity transmitter using SCBC in accordance with the present invention.

FIG. 6a is a circuitry diagram showing a configuration of one embodiment of a multi-code (e.g., two codes) MC-CDMA diversity transmitter using the SCBC in accordance with the present invention, which represents a configuration of a base station transmitter in case where the SCBC transmission diversity method is applied to the MC-CDMA system that performs the direct sequence spread spectrum on the frequency axis.

In case where a data transmission rate is R when the number of symbols to be transmitted is one within one modulation symbol interval, FIG. 6a shows an example where a data transmission rate of a kth channel is 2R.

In FIG. 6a, encoded data of the kth channel with the data transmission rate of 2R is first modulated at a modulator 601 and then two modulated symbols $s_{k,0}$ and $s_{k,1}$ are applied to an SCBC encoder 6021 every symbol interval. Then, the SCBC encoder 6021 provides four outputs $s_{k,0}, s_{k,1}, -s^*_{k,1}$, and $s^*_{k,0}$ using the inputted two modulation symbols $s_{k,0}$ and $s_{k,1}$, wherein each output symbol is duplicated at duplicators 6022a to 6022d by N.

Orthogonal code multipliers 6023a to 6023d multiply each of the four outputs $s_{k,0}, s_{k,1}, -s^*_{k,1}$, and $s^*_{k,0}$ by a corresponding orthogonal code. Through such multiplication operation, each of the four outputs $s_{k,0}, s_{k,1}, -s^*_{k,1}$, and $s^*_{k,0}$ is spread by any of two orthogonal codes, i.e., $C^{(k,0)} = [c_0^{(k,0)} c_1^{(k,0)} c_2^{(k,0)} \ldots c_{N-1}^{(k,0)}]^T$ and $C^{(k,1)} = [C_0^{(k,1)} c_1^{(k,1)} c_2^{(k,1)} \ldots c_{N-1}^{(k,0)}]^T$ assigned to the kth channel on the frequency axis.

Among the spread signals, the signals $s_{k,0} C^{(k,0)}$ and $s_{k,1} C^{(k,1)}$ are added at an adder 6024a for each subcarrier to output an added signal to a path for a first antenna 609a, and the signals $S^*_{k,0} C^{(k,1)}$ and $-S^*_{k,1} C^{(k,0)}$ are added at an adder 6024b for each subcarrier to provide an added signal to a path for a second antenna 609b. The signals $s_0$ outputted are again added to signals of other channels at adders 603a and 603b for each antenna and subcarrier and then multiplied by scrambling codes at scramblers 604a and 604b. In the forgoing, $s_{k,0} C^{(k,0)}, s_{k,1} C^{(k,1)}, s^*_{k,0} C^{(k,1)}, -s^*_{k,1} C^{(k,0)}$ are all vectors.

The outputs from the scramblers 604a and 604b are IFFT-transformed at IFFT units 605a and 605b and then processed at parallel/serial converters 606a and 606b to provide arranged serial data. And then, CP is inserted into each of the outputs from the parallel/serial converters 606a and 606b at CP inserters 607a and 607b; and the CP-inserted signals are multiplied by a given gain and then converted into RF wireless signals at IF/RF processors 608a and 608b to transmit via the antennas 609a and 609b.

Figure 6B:
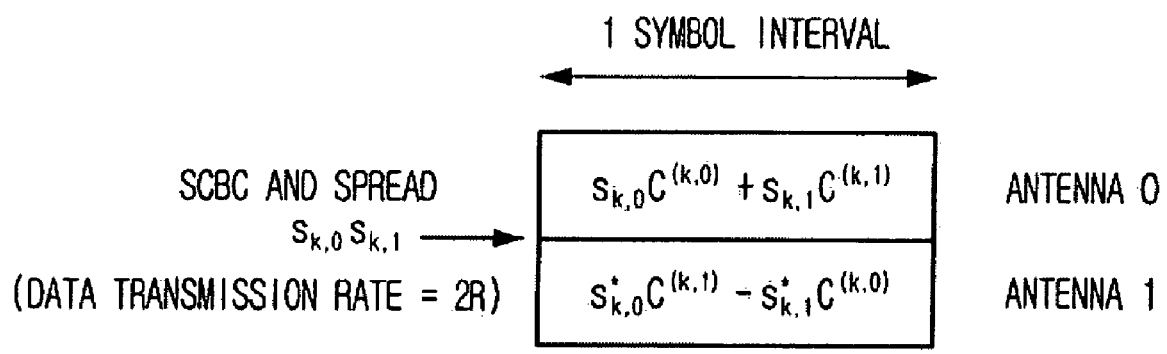
FIG. 6b is a view describing the concept of the SCBC transmission diversity in the MC-CDMA diversity transmitter shown in FIG. 6a in accordance with the present invention.

Meanwhile, FIG. 6b shows a view describing the concept of the SCBC transmission diversity in the MC-CDMA diversity transmitter shown in FIG. 6a.

It can be seen from FIG. 6b that the outputs from the modulator 601, $s_{k,0}$ and $s_{k,1}$, are SCBC-processed and spread to transmit $s_{k,0} C^{(k,0)} + s_{k,1} C^{(k,1)}$ to the antenna 0 609a and $s^*_{k,0} C^{(k,1)} - s^*_{k,1} C^{(k,0)}$ to the antenna 1 609b. In other words, it can be found that the transmission diversity can be made within one symbol interval.

Figure 7:
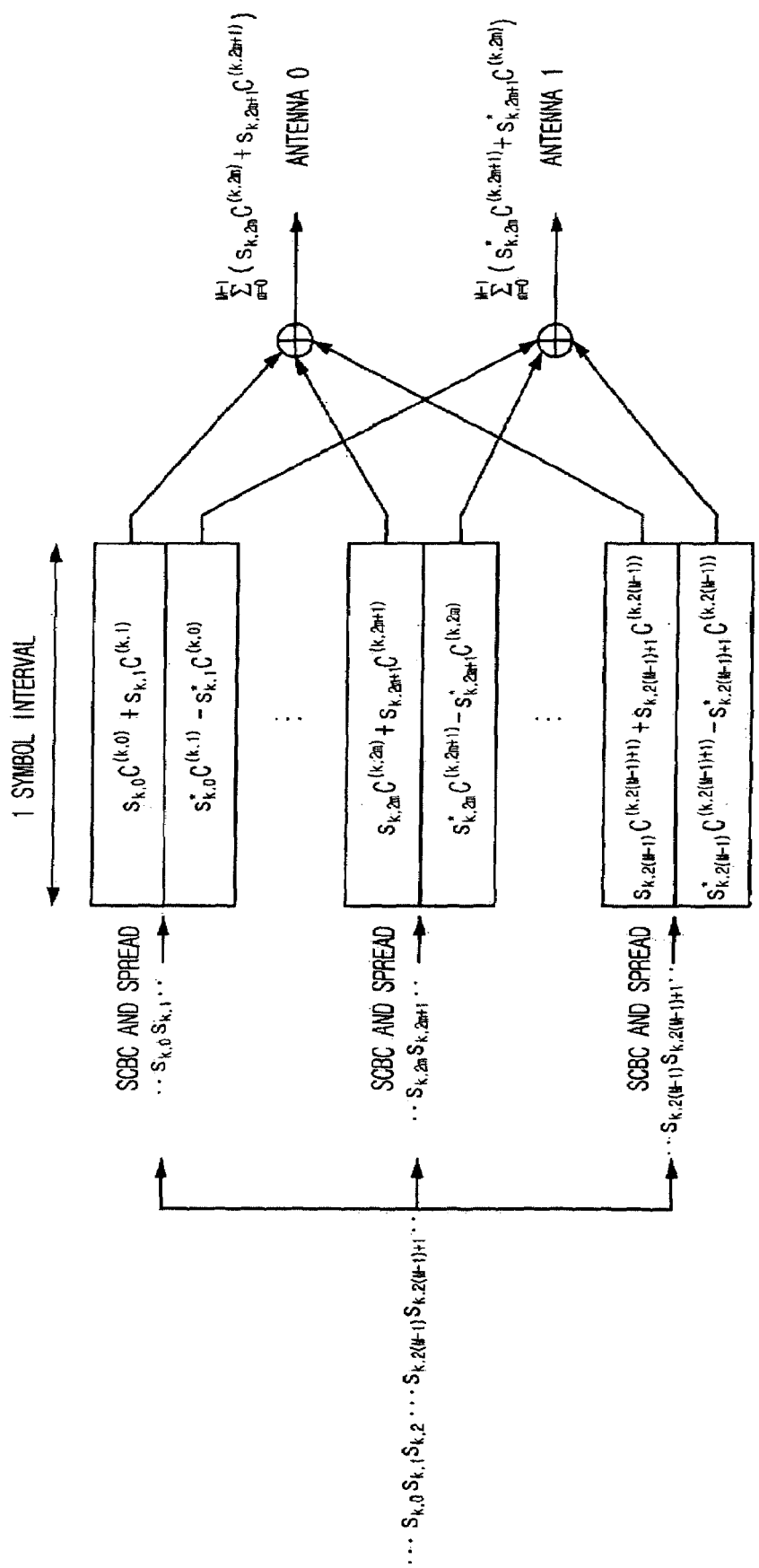
FIG. 7 shows a view explaining the concept of an SCBC transmission diversity method where 2M codes are assigned to an arbitrary user in accordance with the present invention.

FIG. 7 shows a view explaining the concept of an SCBC transmission diversity method where 2M codes are assigned to an arbitrary user in accordance with the present invention. That is, FIG. 7 presents an example where the transmission diversity method in accordance with the present invention is applied in case where 2M orthogonal codes are assigned to a kth user.

Among 2M modulation symbols, each pair of two symbols is SCBC-encoded, spread by an orthogonal code corresponding to each symbol, added for each antenna, and then transmitted simultaneously, within one modulation symbol interval.

For instance, if 2mth symbol and (2m+1)th symbol among the 2M modulation symbols are $s_{k,2m}$ and $s_{k,2m+1}$, respectively, each pair of two symbols is SCBC-encoded, wherein m is 0, 1, 2, ..., M−1. And then, each of the SCBC-encoded symbols is spread by $C^{(k,2m)} = [c_0^{(k,2m)} c_1^{(k,2m)} c_2^{(k,2m)} \ldots c_{N-1}^{(k,2m)}]^T$ and $C^{(k,2m+1)} = [c_0^{(k,2m+1)} c_1^{(k,2m+1)} c_2^{(k,2m+1)} \ldots c_{N-1}^{(k,2m+1)}]^T$, respectively, added for each antenna and then outputted.

Hence, a component transmitted to the first antenna (antenna 0) becomes $$\sum_{m=0}^{M-1} (s_{k,2m} C^{(k,2m)} + s_{k,2m+1} C^{(k,2m+1)})$$

and a component to the second antenna (antenna 1) becomes $$\sum_{m=0}^{M-1} (s^*_{k,2m} C^{(k,2m+1)} - s^*_{k,2m+1} C^{(k,2m)}).$$

And, since the number of the orthogonal codes used is 2M, the data transmission rate becomes 2MR.

Figure 8:
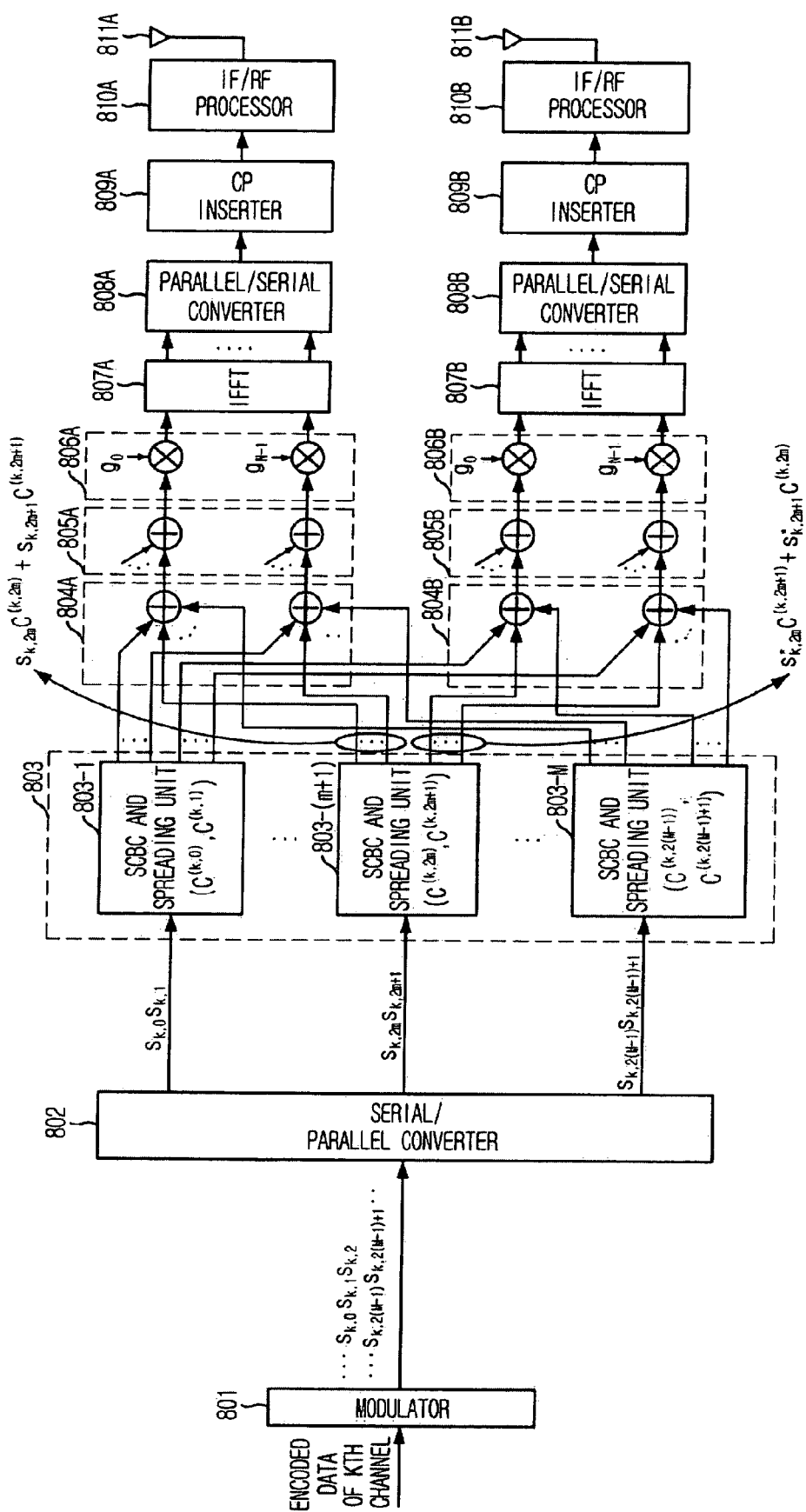
FIG. 8 is a circuitry diagram showing a configuration of one embodiment of an MC-CDMA diversity transmitter using SCBC in case where 2M codes are assigned to an arbitrary user in accordance with the present invention.

FIG. 8 is a circuitry diagram showing a configuration of one embodiment of an MC-CDMA diversity transmitter using SCBC in case where 2M codes are assigned to an arbitrary user in accordance with the present invention. That is, FIG. 8 offers a structure of an MC-CDMA transmitter employing a transmission diversity technology in accordance with the present invention in case where 2M orthogonal codes are assigned to a kth user.

At first, encoded data of a kth channel is modulated at a modulator 801 and then 2M modulation symbols are applied to a serial/parallel converter 802 at each transmission modulation symbol interval. Then, the serial/parallel converter 802 simultaneously outputs total M symbol pairs in parallel.

Each of the M symbol pairs, e.g., $s_{k,0}$ and $s_{k,1}$, etc., is provided to an SCBC and spreading unit 803 wherein two vector signals $s_{k,2m}C^{(k,2m)}+s_{k,2m+1}C^{(k,2m+1)}$ and $s^*_{k,2m}C^{(k,2m+1)}s^*_{k,2m+1}C^{(k,2m)}$ are outputted from each of SCBC and spreading units 803-1 to 803-M.

The output vector signals from the M SCBC and spreading units 803-1 to 803-M are combined at combiners 804a and 804b for antenna paths composed of adders. Hence, an output from the combiner 804a for the first antenna becomes $$\sum_{m=0}^{M-1}(s_{k,2m}C^{(k,2m)}+s_{k,2m+1}C^{(k,2m+1)})$$

and an output from the combiner 804b for the second antenna becomes $$\sum_{m=0}^{M-1}(s^*_{k,2m}C^{(k,2m+1)}-s^*_{k,2m+1}C^{(k,2m)}).$$

The outputs from the combiners 804a and 804b for the antenna paths are applied to channel combiners 805a and 805b to add to channel signals of other users. And then, the added signals are scrambled by multiplying by scrambling codes at scramblers 806a and 806b.

The outputs from the scramblers 806a and 806b are IFFT-transformed at IFFT units 807a and 807b, that is, the frequency domain signals are transformed into corresponding time domain signals, and then processed at parallel/serial converters 808a and 808b to obtain converted serial signals.

Thereafter, CP is inserted into each of the outputs from the parallel/serial converters 808a and 808b at CP inserters 809a and 809b; and then the CP-inserted signals are amplified and converted into RF signals at IF/RF processors 810a and 801b to transmit them via corresponding antennas 811a and 811b.

Figure 9:
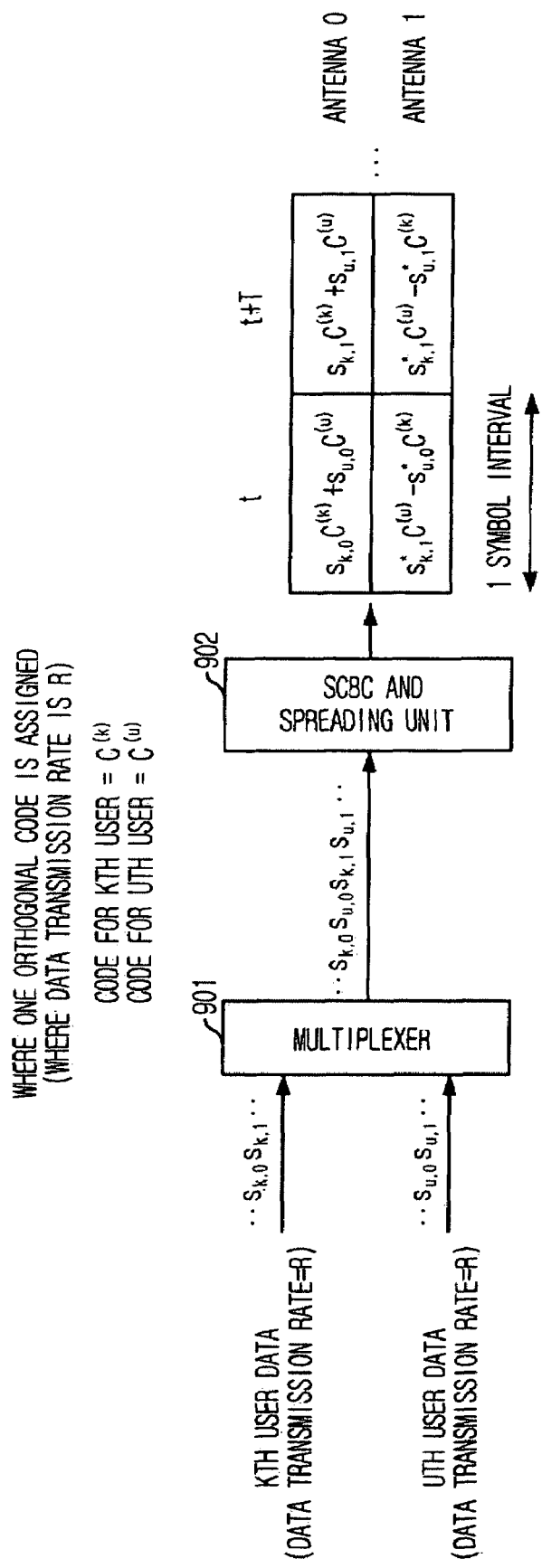
FIG. 9 is a view describing the concept of a transmission diversity method where one orthogonal code is assigned to each of arbitrary two users' channels in accordance with the present invention.

FIG. 9 shows a view describing the concept of a transmission diversity method where one orthogonal code is assigned to each of arbitrary two users' channels in accordance with the present invention. That is, FIG. 9 presents a transmission diversity method in accordance with the present invention in case where one orthogonal code is assigned to an arbitrary user channel, i.e., the data transmission rate is R.

In this case, a transmitter of the present invention multiplexes modulation .symbols of arbitrary two channels whose data transmission rate is R at a multiplexer 901, and then SCBC-encodes and spreads the multiplexed symbols using two orthogonal codes assigned to each channel at an SCBC and spreading unit 902 to transmit spread signals.

Details of the transmitter will be given below.

For example, if modulation signals of kth and uth users' channels are $s_{k,0}$ and $s_{u,0}$ at an arbitrary transmission interval, respectively, the multiplexed signal from the multiplexer 901 becomes $s_{k,0}\ s_{u,0}$ which is then applied to the SCBC and spreading unit 902, wherein the signal is SCBC-encoded and spread to orthogonal codes $C^{(k)}$ and $C^{(u)}$ assigned to each channel to output $s_{k,0}C^{(k)}+s_{u,0}C^{(u)}$ to the first antenna and also provide $s^*_{k,0}C^{(u)}-s^*_{u,0}C^{(k)}$ to the second antenna.

With respect to the diversity transmission signals as described early, a mobile station receiver performs SCBC decoding and then takes only corresponding users' channel symbols excepting other users' channel symbols.

Figure 10:
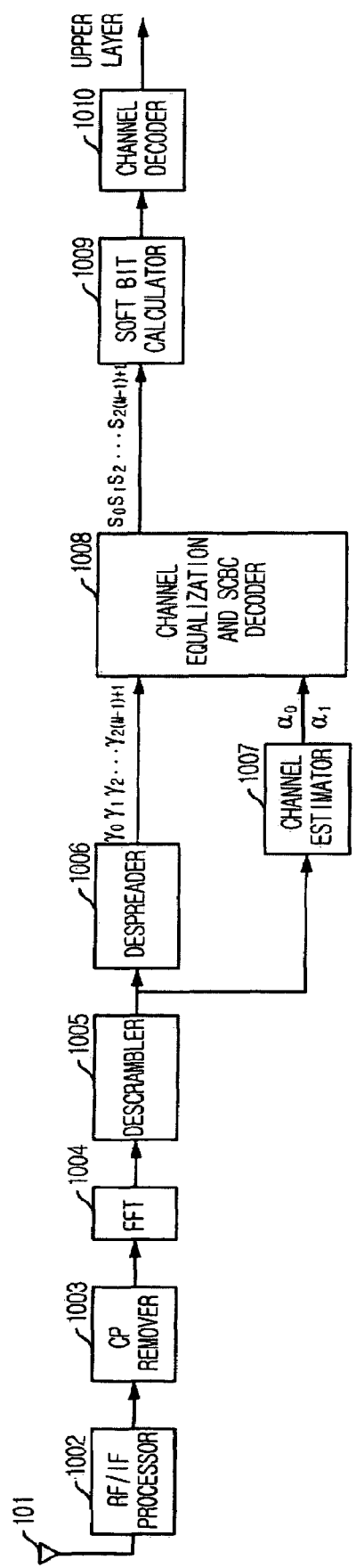
FIG. 10 is a circuitry diagram showing a configuration of one embodiment of a CDMA mobile station receiver with respect to the transmission diversity in accordance with the present invention.

FIG. 10 is a circuitry diagram showing a configuration of one embodiment of a CDMA mobile station receiver with respect to the transmission diversity of the present invention, which represents a structure of a mobile station receiving end in case where the transmission diversity technique of the present invention is applied to the MC-CDMA base station transmitting end.

As shown in FIG. 10, the MC-CDMA mobile station receiver of the invention comprises an antenna 1001, an RF/IF processor 1002, a CP remover 1003, an FFT block 1004, a descrambler 1005, a despreader 1006, a channel estimator 1007, a channel equalization and SCBC decoder 1008, a soft bit calculator 1009, and a channel decoder 1010. Each of the elements will be described below in detail.

A wireless signal is first received via the antenna 1001 and then amplified and converted into a baseband signal at the RF/IF processor 1002.

The CP remover 1003 serves to remove CP from the output signal provided from the RF/IF processor 1002, and the FFT 1004 transforms the time domain signal from the CP remover 1003 into a corresponding frequency domain signal. And then, the descrambler 1005 descrambles the frequency domain signal from the FFT 1004.

The despreader 1006 despreads the descrambled signal to an orthogonal signal; and the channel estimator 1007 conducts channel estimation with respect to two wireless paths between two base station transmission antenna and mobile station reception antenna from the descrambled signal.

The channel equalization and SCBC decoder 1008 performs channel equalization and SCBC decoding using the outputs from the despreader 1006 and the channel estimator 1007, that is, the despread reception symbols and channel estimation values to thereby recover a transmitted signal Thereafter, the soft bit calculator 1009 receives the output from the channel equalization and SCBC decoder 1008 and calculates a soft bit value to be provided to the channel decoder 1010.

And then, the channel decoder 1010 conducts the channel decoding and offers the decoded result to an upper layer.

Hereinafter, a more detailed description of the receiver will be provided.

For instance, if a transmitting end utilizes 2M orthogonal codes for kth user channel as shown in FIG. 8 (that is, if a data transmission rate is 2M that is twice a basic transmission rate R), the despreader 1006 of the mobile station receiver as shown in FIG. 10 outputs results that are despread to the 2M orthogonal codes assigned to the kth user channel every symbol interval.

Then, the channel equalization and SCBC decoder 1008 receives the 2M outputs from the despreader 1006 at each symbol interval and performs the SCBC decoding therefore.

In other words, in case where a wireless channel estimated value between the first transmission antenna (base station transmission antenna) and the mobile station reception antenna is $\alpha_0$, and a wireless channel estimated value between the second transmission antenna (base station transmission antenna) and the mobile station reception antenna is $\alpha_1$ at an arbitrary symbol interval, if the symbol values despread by the orthogonal codes $C^{(k+2m)}$ and $C^{(k+2m+1)}$ (where m=0, 1, 2, ..., M−1) are $r_{2m}$ and $r_{2m+1}$, respectively, the output from the channel equalization and SCBC decoder 1008 may be as follows:

$$\hat{s}_{2m} = r_{2m}\alpha^*_0 + r^*_{2m+1}\alpha_1$$

$$\hat{s}_{2m+1} = r_{2m}\alpha^*_1 - r^*_{2m+1}\alpha_0 \quad \text{Eq. (3)}$$

where m=0, 1, 2, ..., M−1

On the other hand, if a transmitting end multiplexes and SCBC-encodes with respect to each of two users' channels to which only one orthogonal code is assigned and then transmits the results at the transmitter as shown in FIG. 9, the despreader 1006 of the mobile station receiver as shown in FIG. 10 despreads to the orthogonal code $C^{(k)}$ assigned to the kth user channel and to the orthogonal code $C^{(u)}$ assigned to the uth user channel.

Then, using the two symbols $r_k$ and $r_u$ despread at the despreader 1006 and the output values $\alpha_0$ and $\alpha_1$ from the channel estimator 1007, the channel equalization and SCBC decoder 1008 provides a signal obtained by taking the following equation 4 when the current mobile station is for the kth user channel and a signal derived by taking the following equation 5 when the current mobile state is for the uth user channel.

$$\hat{s}_k = r_k\alpha^*_0 + r^*_u\alpha_1 \quad \text{Eq. (4)}$$

$$\hat{s}_u = r_k\alpha^*_1 - r^*_u\alpha_0 \quad \text{Eq. (5)}$$

Figure 11A:
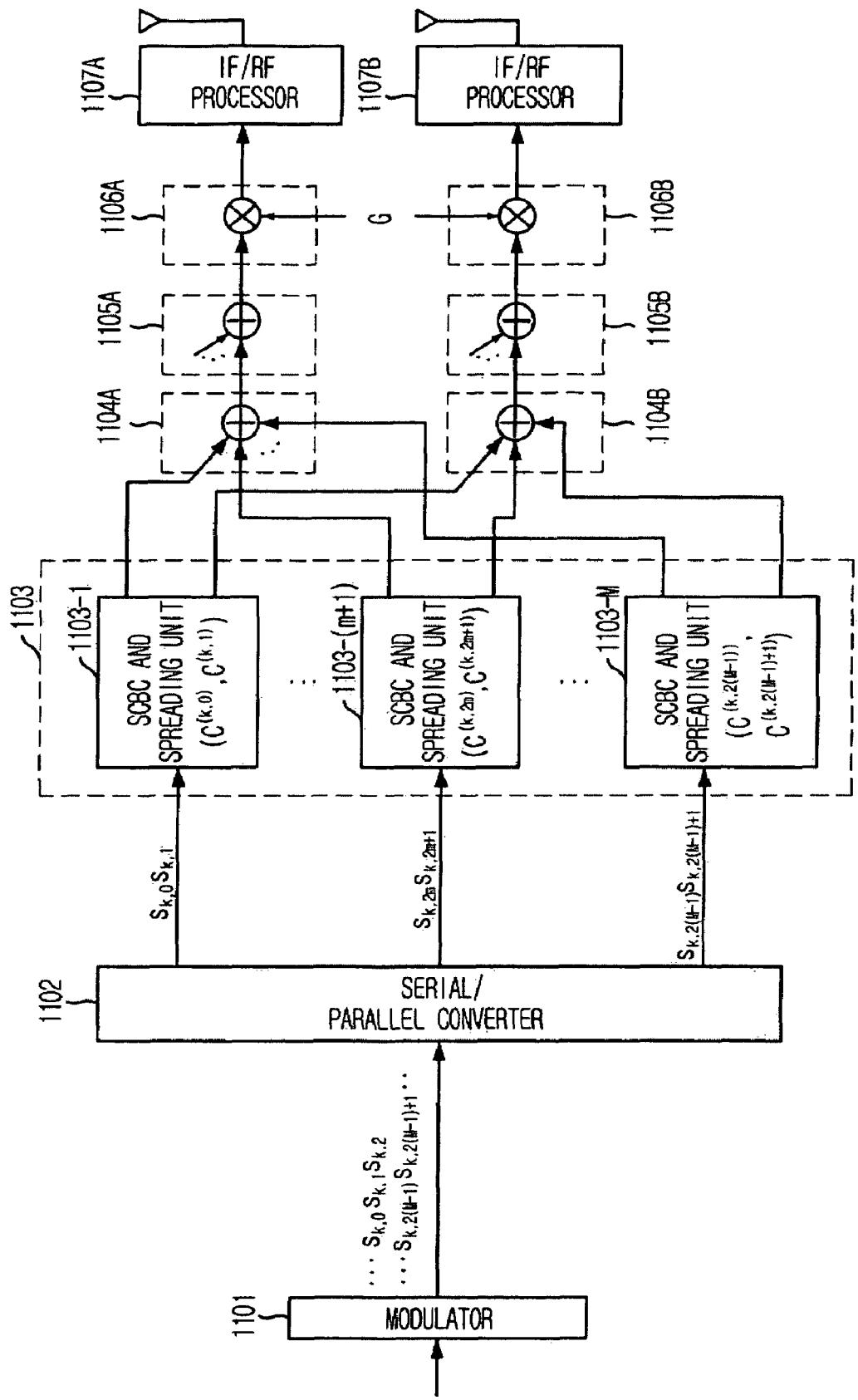
FIG. 11a is a circuitry diagram depicting a configuration of one embodiment of a DS-CDMA diversity transmitter using SCBC in case where 2M codes are assigned to an arbitrary user in accordance with the present invention.
Figure 11B:
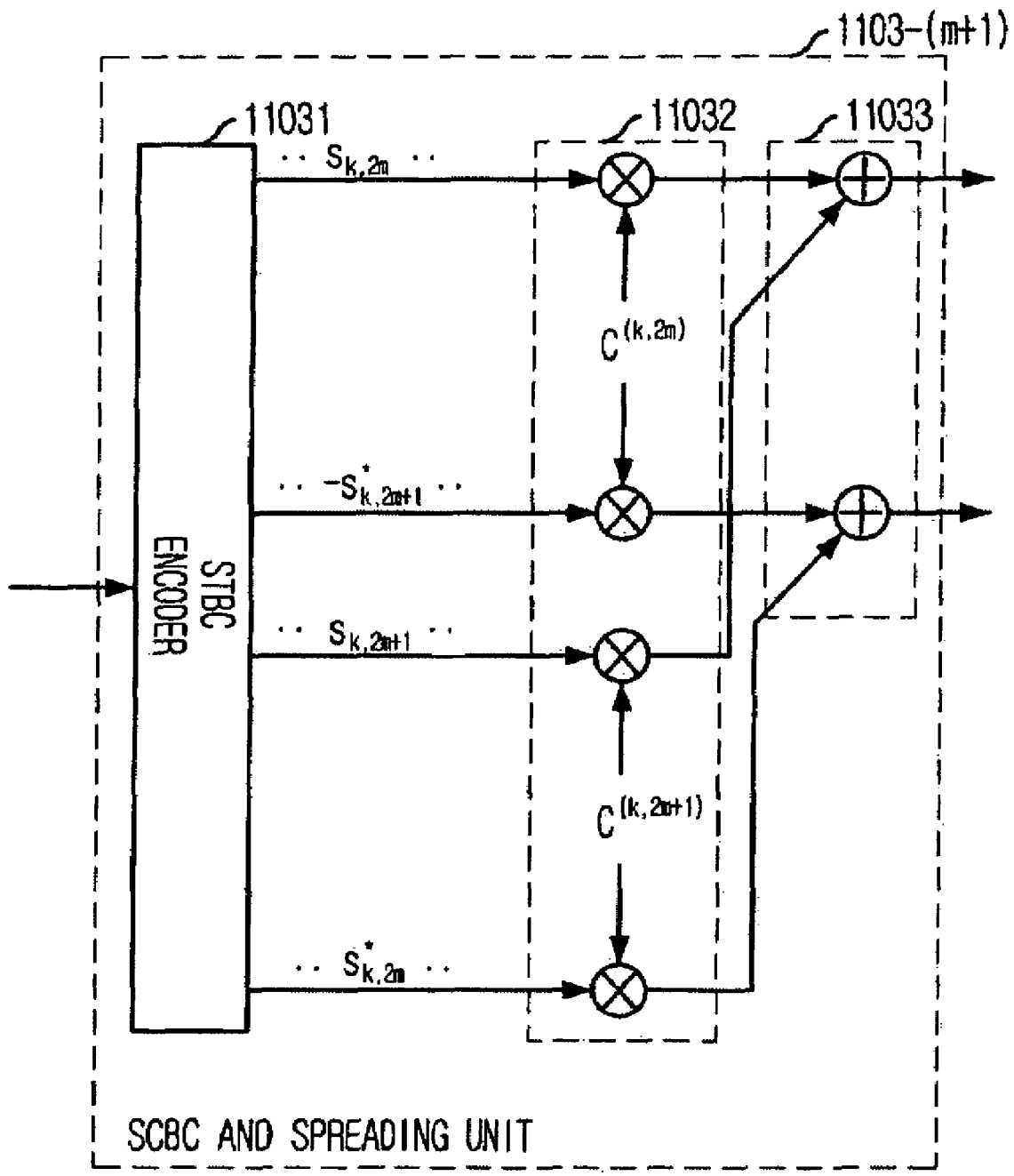

FIG. 11a is a circuitry diagram depicting a configuration of one embodiment of a DS-CDMA diversity transmitter using SCBC in case where 2M codes are assigned to an arbitrary user in accordance with the present invention, and FIG. 11b is a circuitry diagram illustrating a configuration of the SCBC and spreading unit of the invention shown in FIG. 11a.

The basic concept of the DS-CDMA diversity transmitter (base station transmitter) as shown in FIGS. 11a and 11b is the same as that of the MC-CDMA as shown in FIG. 8 except that the spreading process is carried out on the time axis. Details thereof will be presented hereinafter.

Firstly, encoded data every channel is modulated at a modulator 1101 and then 2M modulation symbols are applied to a serial/parallel converter 1102 at each transmission modulation symbol interval. Then, the serial/parallel converter 1102 simultaneously outputs a total M number of symbol pairs in parallel. Each of the M symbol pairs, e.g., $s_{k,0}$ and $s_{k,1}$, etc., is provided to an SCBC and spreading unit 1103 wherein two vector signals are outputted from each of SCBC and spreading units 1103-1 to 1103-M. For example, an (m+1)th SCBC and spreading unit 1103-(m+1) included in the SCBC and spreading unit 1103 provides $s_{k,2m}C^{(k,2m)} + s_{k,2m+1}C^{(k,2m+1)}$ and $s^*_{k,2m}C^{(k,2m+1)} - s^*_{k,2m+1}C^{(k,2m)}$ (see FIG. 11b).

The output vector signals from the M SCBC and spreading units 1103-1 to 1103-M are added at adders 1104a and 1104b for each antenna path. Hence, an output from the adder 1104a for a first antenna path becomes $$\sum_{m=0}^{M-1} (s_{k,2m}C^{(k,2m)} + s_{k,2m+1}C^{(k,2m+1)})$$

and an output from the adder 1104b for a second antenna path becomes $$\sum_{m=0}^{M-1} (s^*_{k,2m}C^{(k,2m+1)} - s^*_{k,2m+1}C^{(k,2m)}).$$

The outputs from the adders 1104a and 1104b are applied to channel combiners 1105a and 1105b to add to channel signals of other users. And then, the added signals are scrambled by multiplying by scrambling codes at scramblers 1106a and 1106b.

The outputs from the scramblers 1106a and 1106b are amplified and converted into RF signals at IF/RF processors 1107a and 1107b to transmit them via corresponding antennas.

As can be seen from the drawing, since the DS-CDMA base station transmitter performs the spreading process on the time axis, it doesn't include the IFFTs 807a and 807b, the parallel/serial converters 808a and 808b, and the CP inserters 809a and 809b, which are involved in the MC-CDMA as shown in FIG. 8.

Meanwhile, a description will be given below in detail with respect to the (m+1)th SCBC and spreading unit 1103-(m+1) in the SCBC and spreading unit 1103.

The outputs from the serial/parallel converter 1102, $s_{k,2m}$ and $s_{k,2m+1}$, are provided to an SCBC encoder 11031; and the outputs therefrom are then spread by multiplying by orthogonal codes at a spreader 11032. Lastly, outputted from an adding unit 11033 are a baseband signal to be $s_{k,2m+1}C^{(k,2m)} + s_{k,2m+1}C^{(k,2m+1)}$ to be transmitted via a first transmission antenna and a baseband signal $s^*_{k,2m}C^{(k,2m+1)} - s^*_{k,2m+1}C^{(k,2m)}$ to be transmitted via a second transmission antenna.

As a result, the present invention allows the antenna diversity to be conducted within one symbol interval, thereby improving the performance of system in wireless channel environments where Doppler effect exists, compared to a conventional STBC transmission diversity method which makes the antenna diversity performed over two symbol intervals.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-48940, filed with the Korean Intellectual Property Office on Jun. 8, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A Space Code Block Coding (SCBC) and spreading apparatus for transmission diversity in a Code Division Multiple Access (CDMA) communication system, the apparatus comprising:

an encoding means for generating and outputting a predetermined number of different transmission data in parallel with respect to a plurality of modulation symbols inputted during one modulation symbol interval, wherein the predetermined number of different transmission data is twice as that of modulation symbols;

an orthogonal code generation means for producing orthogonal codes;

a spreading means for spreading each of the predetermined number of different transmission data generated from the encoding means using the orthogonal codes generated from the orthogonal code generation means; and a combining means for combining the predetermined number of different transmission data spread at the spreading means to provide combined data for each transmission antenna path so that a transmission diversity is made within said one modulation symbol interval, wherein in case where two modulation symbols are inputted during one modulation symbol interval, the encoding means generates, for a first modulation symbol, the first modulation symbol itself and its positive conjugate complex and, for a second modulation symbol, the second modulation symbol itself and its negative conjugate complex, as transmission data, the generated transmission data being simultaneously provided in parallel.

2. The apparatus as recited in claim 1, wherein the spreading means performs the spreading operation by multiplying each of the first modulation symbol and the negative conjugate complex of the second modulation symbol by a first orthogonal code, and multiplying each of the second modulation symbol and the positive conjugate complex of the first modulation symbol by a second orthogonal code.

3. The apparatus as recited in claim 2, wherein the combining means combines the first modulation symbol spread to the first orthogonal code with the second modulation symbol spread to the second orthogonal code, and combines the conjugate complex of the first modulation symbol spread to the first orthogonal code and the negative conjugate complex of the second modulation symbol spread to the second orthogonal code, to thereby output the combined values to different antenna paths.

4. A CDMA diversity transmitter for a CDMA communication system, comprising:

a modulation means for modulating channel-coded symbol data;

a serial/parallel conversion means for converting a plurality of modulation symbols inputted every modulation symbol interval from the modulation means to provide pairs of modulation symbols made every predetermined number of modulation symbols in parallel;

a plurality of (space code block coding) SCBC and spreading means for generating a predetermined number of different transmission data in parallel with respect to every each of the pairs of modulation symbols provided by the serial/parallel conversion means, spreading the transmission data using orthogonal codes, and combining the spread transmission data so that a transmission diversity is made within one modulation symbol interval, wherein the predetermined number of different transmission data is twice as that of modulation symbols;

a combining means for combining the outputs from each of the plurality of SCBC and spreading means to generate a baseband signal for each antenna path; and a wireless signal processing means for converting each of the baseband signals into a wireless signal, and a multiplexing means for providing modulation symbols of two user channels to be transmitted within one modulation symbol interval to the serial/parallel conversion means alternately, in case where the number of transmission antennas of the transmitter are two and one orthogonal code is assigned to each of a plurality of user channels.

5. The CDMA diversity transmitters as recited in claim 4, further comprising an Inverse Fast Fourier Transform (IFFT) means for transforming each of the baseband signals in the frequency domain generated from the combining means for each antenna path into a time domain signal, in case where the CDMA communication system employs a Multi-Carrier CDMA (MC-CDMA) scheme, wherein each of the SCBC and spreading means performs the spreading process in the frequency domain.

6. The CDMA diversity transmitter as recited in claim 5, further comprising:

a scrambling means for scrambling the outputs from the combining means for each. antenna path; and a Cyclic Prefix (CP) insertion means for inserting CP into each of the outputs from the IFFT means.

7. The CDMA diversity transmitter as recited in claim 4, wherein in case where the CDMA communication system employs a Direct Sequence CDMA (DS-CDMA) scheme, each of the SCBC and spreading means performs the spreading process in the time domain.

8. A CDMA mobile station receiver for receiving a diversity signal transmitted in a CDMA communication system, comprising:

a wireless signal processing means for converting a wireless signal received via a reception antenna into a baseband signal;

a despreading means for despreading the baseband signal using orthogonal codes;

a channel estimation means for estimating a channel value for a wireless path between a transmission antenna of the CDMA communication system and the reception antenna from the baseband signal from the wireless signal processing means;

an (space code block coding) SCBC decoding means for recovering a transmitted signal by performing SCBC decoding using the channel estimated value from the channel estimation means and the despread signal from the despreading means; and a bit calculation means for calculating a bit value from the output from the SCBC decoding means, and wherein in case where the number of symbols of despread signals outputted every symbol interval from the despreading means are 2M with M being a natural number and the number of wireless paths is two, the SCBC decoding means performs the SCBC decoding using the following equation:

$$\hat{s}_{2m} = r_{2m}\alpha_0^* + r_{2m+1}^*\alpha_1$$

$$\hat{s}_{2m+1} = r_{2m}\alpha_1^* - r_{2m+1}^*\alpha_0$$

where m=0, 1, 2, ..., M−1 wherein $\alpha_0$ and $\alpha_1$ are wireless channel estimated values between the transmission antenna and the reception antenna of the CDMA communication system; and $r_{2m}$ and $r_{2m+1}$ represent symbol values despread by orthogonal codes $C^{(k+2m)}$ and $C^{(k+2m+1)}$ (where m=0, 1, 2, ..., M−1), respectively.

9. The CDMA mobile station receiver as recited in claim 8, further comprising a Fast Fourier Transform (FFT) means for transforming the baseband signal into a frequency domain signal in case where the CDMA communication system employs MC-CDMA scheme.

10. The CDMA mobile station receiver as recited in claim 9, further comprising:

a CP removal means for removing a CP from the baseband signal outputted from the wireless signal processing means;

a descrambling means for descrambling the frequency domain signal from the FFT means to provide it to the SCBC decoding means and the channel estimation means; and a channel decoding means for performing channel decoding with respect to the output from the bit calculation means.

11. The CDMA mobile station receiver as recited in claim 8, wherein in case where two user channels are multiplexed, SCBC-coded and transmitted in the CDMA communication system, one orthogonal code being assigned to each of the two user channels, the SCBC decoding means acquires a symbol of the corresponding user channel using one of the following equations:

$$\hat{s}_k = r_k \alpha_0^* + r_u^* \alpha_1$$

$$\hat{s}_\alpha = r_k \alpha_1^* - r_u^* \alpha_0$$

Wherein $\alpha_0$ and $\alpha_1$ are wireless channel estimated values between the transmission antenna and the reception antenna of the CDMA communication system; and $r_k$ and $r_u$ represent symbol values despread to an orthogonal code $C^{(k)}$ assigned to a kth user channel and to an orthogonal code $C^{(u)}$ assigned to a uth user channel, respectively.

12. An (space code block coding) SCBC and spreading method for transmission diversity in a CDMA communication system, the method comprising:

generating a predetermined number of different transmission data with respect to a plurality of modulation symbols inputted during one modulation symbol interval;

spreading each of the transmission data generated from the generating the predetermined number of different transmission data with respect to the plurality of modulation symbols inputted during one modulation symbol interval using orthogonal codes; and combining the transmission data s read from the spreading each of the transmission data generated from the generating the predetermined number of different transmission data with respect to the plurality of modulation symbols inputted during one modulation symbol interval to provide a baseband signal for each transmission antenna path so that a transmission diversity is made within said one modulation symbol interval, wherein in case where two modulation symbols are inputted during said one modulation symbol interval, the generating and outputting a predetermined number of different transmission data in parallel with respect to a plurality of modulation symbols inputted during one modulation symbol interval, wherein the predetermined number of different transmission data is twice as that of modulation symbols generates, for a first modulation symbol, the first modulation symbol itself and its positive conjugate complex and, for a second modulation symbol, the second modulation symbol itself and its negative conjugate complex, as transmission data, the generated transmission data being simultaneously provided in parallel.

13. The method as recited in claim 12, wherein said spreading each of the transmission data generated from the generating the predetermined number of different transmission data with respect to the plurality of modulation symbols inputted during one modulation symbol interval using orthogonal codes comprises:

spreading the first modulation symbol and the negative conjugate complex of the second modulation symbol using a first orthogonal code separately; and spreading the second modulation symbol and the positive conjugate complex of the first modulation symbol using a second orthogonal code separately.

14. The method as recited in claim 13, wherein said combining the transmission data spread from the spreading each of the transmission data generated from the generating the predetermined number of different transmission data with respect to the plurality of modulation symbols inputted during one modulation symbol interval to provide a baseband signal for each transmission antenna path so that a transmission diversity is made within said one modulation symbol interval comprises:

combining the first modulation symbol spread at said spreading the first modulation symbol and the negative conjugate complex of the second modulation symbol using the first orthogonal code separately with the second modulation symbol spread at said spreading the second modulation symbol and the positive conjugate complex of the first modulation symbol using the second orthogonal code separately; and combining the conjugate complex of the first modulation symbol spread at said spreading the first modulation symbol and the negative conjugate complex of the second modulation symbol using the first orthogonal code separately and the first orthogonal code with the negative conjugate complex of the second modulation symbol spread at said spreading the second modulation symbol and the positive conjugate complex of the first modulation symbol using the second orthogonal code separately.

* * * * *

UNITED STATES PATENT AND TRADEMARK OFFICE
CERTIFICATE OF CORRECTION

PATENT NO. : 7,620,115 B2 Page 1 of 1
APPLICATION NO. : 11/303846
DATED : November 17, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-sixth Day of October, 2010

David J. Kappos
*Director of the United States Patent and Trademark Office*